US012619206B2

(12) United States Patent
Freda et al.

(10) Patent No.: US 12,619,206 B2
(45) Date of Patent: May 5, 2026

(54) TIME MODULAR ENERGY-INDUSTRIAL SYSTEMS AND THEIR DESIGNS, ARCHITECTURES, OPERATIONS, AND METHODS OF OPTIMIZATION

(71) Applicants:Robert Freda, West Roxbury, MA (US); Robert Charles O'Brien, Idaho Falls, ID (US); Siddharth Pannir, Brighton, MA (US)

(72) Inventors: Robert Freda, West Roxbury, MA (US); Robert Charles O'Brien, Idaho Falls, ID (US); Siddharth Pannir, Brighton, MA (US)

(73) Assignee: INGLASS S.p.A., San Polo di Piave (IT)

( * ) Notice: Subject to any disclaimer, the term of this patent is extended or adjusted under 35 U.S.C. 154(b) by 468 days.

(21) Appl. No.: 18/119,913

(22) Filed: Mar. 10, 2023

(65) Prior Publication Data

US 2023/0288893 A1 Sep. 14, 2023

Related U.S. Application Data

(60) Provisional application No. 63/318,572, filed on Mar. 10, 2022.

(51) Int. Cl.
G05B 19/042 (2006.01)

(52) U.S. Cl.
CPC .... G05B 19/042 (2013.01); *G05B 2219/2639* (2013.01)

(58) Field of Classification Search
None
See application file for complete search history.

(56) References Cited

U.S. PATENT DOCUMENTS

| | | | |
|---|---|---|---|
| 9,630,614 B1 | 4/2017 | Hill et al. | |
| 10,229,757 B2 | 3/2019 | Filippone et al. | |
| 10,852,037 B2 | 12/2020 | Sant'Anselmo et al. | |
| 11,329,485 B2 * | 5/2022 | Riverso | G05B 15/02 |
| 11,438,434 B2 * | 9/2022 | Mandal | G16Y 40/10 |
| 11,444,343 B2 | 9/2022 | O'Hora | |
| 11,493,893 B2 * | 11/2022 | Kan | G06F 9/547 |
| 11,561,021 B2 * | 1/2023 | Riverso | H02J 13/00004 |

(Continued)

*Primary Examiner* — Jason Lin
(74) *Attorney, Agent, or Firm* — RMCK Law Group PLC

(57) ABSTRACT

A time modular system architecture capable of deforming energy industrial information productive inventories as a current demand topography evolves over time is provided. In embodiments, the system comprises an energy source, a productive component, a network component and a digital component. The energy source outputs energy. The productive component comprises a product (taken in the expansive meaning of any goods or services produced in the economy) output by the system. The network component connects the energy source to the productive component. The digital component determines shifts in demand of the productive component, manages automated systems, and optimizes the energy source based on the shifts in demand of the productive-consumptive component. Each of the energy source, network component and productive component are dynamically modified to optimize utilization based on supply and demand to deliver higher economic and societal intensity per unit of energy source(s).

13 Claims, 9 Drawing Sheets

Key/Legend

NB crate energy source production crate processing crate

Network node crate storage

(56) References Cited

U.S. PATENT DOCUMENTS

| | | | | |
|---|---|---|---|---|
| 11,684,025 | B2 * | 6/2023 | Ouammi | A01G 9/247 |
| | | | | 700/278 |
| 11,709,480 | B2 * | 7/2023 | Moorhouse | G06F 18/40 |
| | | | | 700/9 |
| 11,917,733 | B2 * | 2/2024 | Robell | H05B 45/10 |
| 11,963,493 | B2 * | 4/2024 | Robell | A01G 31/06 |
| 2006/0276938 | A1 | 12/2006 | Miller | |
| 2007/0255461 | A1 * | 11/2007 | Brickfield | H02J 3/003 |
| | | | | 700/295 |
| 2010/0017045 | A1 * | 1/2010 | Nesler | B60L 53/665 |
| | | | | 700/295 |
| 2013/0198023 | A1 * | 8/2013 | El Khayat | G06Q 30/0627 |
| | | | | 705/26.1 |
| 2015/0121113 | A1 * | 4/2015 | Ramamurthy | H02J 9/062 |
| | | | | 713/340 |
| 2015/0200544 | A1 * | 7/2015 | Kitaji | H02J 13/00028 |
| | | | | 700/295 |
| 2016/0334825 | A1 * | 11/2016 | Nesler | H02J 13/00001 |
| 2017/0163084 | A1 * | 6/2017 | Malone | G05B 15/02 |
| 2018/0196456 | A1 * | 7/2018 | ElBsat | G05B 15/02 |
| 2018/0316187 | A1 * | 11/2018 | Shim | H02J 3/00 |
| 2019/0324411 | A1 * | 10/2019 | Vanhoudt | G05B 15/02 |
| 2019/0338976 | A1 * | 11/2019 | Chakraborty | F24F 11/64 |
| 2020/0059098 | A1 * | 2/2020 | Dong | G06Q 50/06 |
| 2020/0333032 | A1 * | 10/2020 | Riverso | H02J 3/14 |
| 2021/0082587 | A1 * | 3/2021 | Inman | B64G 1/408 |
| 2021/0098143 | A1 * | 4/2021 | Trojer | G21C 5/10 |
| 2022/0381471 | A1 * | 12/2022 | Wenzel | F24F 11/47 |
| 2023/0195141 | A1 * | 6/2023 | Cheung | B60W 60/00256 |
| | | | | 701/23 |

* cited by examiner

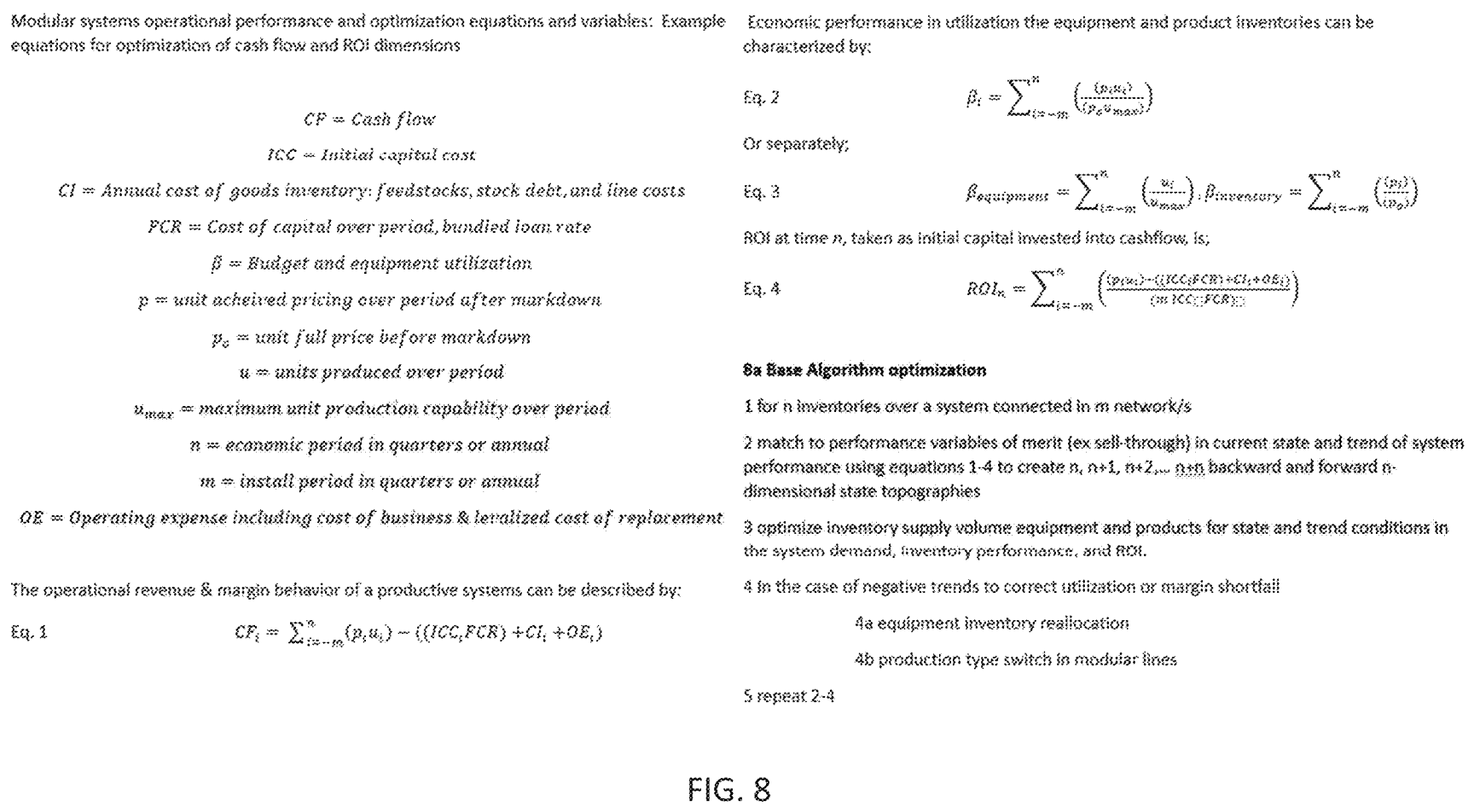

Modular systems operational performance and optimization equations and variables. Example equations for optimization of cash flow and ROI dimensions $CF$ = Cash flow $ICC$ = Initial capital cost $CI$ = Annual cost of goods inventory: feedstocks, stock debt, and line costs $FCR$ = Cost of capital over period, bundled loan rate $\beta$ = Budget and equipment utilization $p$ = unit achieved pricing over period after markdown $p_o$ = unit full price before markdown $u$ = units produced over period $u_{max}$ = maximum unit production capability over period $n$ = economic period in quarters or annual $m$ = install period in quarters or annual $OE$ = Operating expense including cost of business & leralized cost of replacement The operational revenue & margin behavior of a productive systems can be described by:

Eq. 1     $CF_i = \sum_{i=-n}^{n} (p_i u_i) - ((ICC_i FCR) + CI_i + OE_i)$

Economic performance in utilization the equipment and product inventories can be characterized by:

Eq. 2     $\beta_i = \sum_{i=-n}^{n} \left( \frac{p_i u_i}{p_o u_{max}} \right)$ Or separately;

Eq. 3     $\beta_{equipment} = \sum_{i=-n}^{n} \left( \frac{u_i}{u_{max}} \right) ; \beta_{inventory} = \sum_{i=-n}^{n} \left( \frac{p_i}{p_o} \right)$ ROI at time $n$, taken as initial capital invested into cashflow, is, Eq. 4     $ROI_n = \sum_{i=-n}^{n} \left( \frac{(p_i u_i) - ((ICC_i FCR) + CI_i + OE_i)}{(m ICC_i) FCR_i} \right)$

8a Base Algorithm optimization

1 for n inventories over a system connected in m network/s 2 match to performance variables of merit (ex sell-through) in current state and trend of system performance using equations 1-4 to create n, n+1, n+2... then backward and forward n-dimensional state topographies 3 optimize inventory supply volume equipment and products for state and trend conditions in the system demand, inventory performance, and ROI.

4 in the case of negative trends to correct utilization or margin shortfall 4a equipment inventory reallocation 4b production type switch in modular lines 5 repeat 2-4

FIG. 8

TIME MODULAR ENERGY-INDUSTRIAL SYSTEMS AND THEIR DESIGNS, ARCHITECTURES, OPERATIONS, AND METHODS OF OPTIMIZATION

CROSS-REFERENCE TO RELATED APPLICATIONS

This application claims the benefit of U.S. Provisional Application No. 63/318,572 filed Mar. 10, 2022. The disclosure of the above application is incorporated herein by reference.

FIELD

The present disclosure relates to time modular energy-industrial systems.

BACKGROUND

A true modular system is a system that exhibits modularity in x, y, z, and time (t). Systems adaptable in t in the physical dimension and the system architectures, management systems, algorithms, and methods to optimize their performance are unknown in the art. Modular systems and platform systems currently described in the art or reduced to practice such as Mero truss systems or the CE platforms for laptops, tablets, or phones, are fixed in physical form and function at the time of their assembly and are not designed for either the system, sub-systems, or components from the energy and equipment level to the product level to be upgraded on a standardized basis or thereby to be adapted to the next state of technology or demand or function either partially or wholly. The only systems adaptable in situ today are networked digital software systems.

Current definitions of and art in modularity are limited to the platform/standard interpretation of the term and remain focused on modular components and commodity positioning in systems such as Radically Engineered Modular Systems for coal gasification or automotive and CE platform systems. Such systems do not leverage the advantages of modularity and the potentials of modular production and energy equipment and systems designed for mobility. Therefore modularity's effect on system performance under the assumed constraints is limited. Modular systems need not be designed to the assumed constraints and may be designed specifically to eliminate said constraints from energy-industrial systems.

SUMMARY

A time modular system architecture capable of deforming energy industrial information productive inventories as a current demand topography evolves over time is provided. In embodiments, the system comprises an energy source, a productive component, a network component and a digital component. The energy source outputs energy. The productive component comprises a product (taken in the expansive meaning of any goods or services produced in the economy) output by the system. The network component connects the energy source to the productive component. The digital component determines shifts in demand of the productive component, manages automated systems, and optimizes the energy source based on the shifts in demand of the productive-consumptive component. Each of the energy source, network component and productive component are dynamically modified to optimize utilization based on supply and demand to deliver higher economic and societal intensity per unit of energy source(s).

In examples the energy source is a mobile energy source. In examples, the energy source can be a microreactor. The mircroreactor can be one of a nuclear fission and fusion microreactor. The digital component can comprise an Internet of Things (IoT) inventory of modules (consumption premise equipment) that measure demand. In other examples, the digital component can comprise a digital purchasing management channel. In examples, the product can comprise one of energy, food, water and health services.

A method of deforming energy industrial information productive inventories based on evolving demand topopgraphy is provided. The method comprises providing a first allocation of energy equipment inventory. The energy equipment inventories include a plurality of mobile energy sources. Product inventories are output based on the first energy equipment inventory allocation. A change in at least one of demand, inventory performance and return on investment (ROI) is determined related to the outputted product inventories. The first allocation of the energy equipment inventory is modified to a second allocation of energy equipment inventory using a distinct quantity of the mobile energy sources from the first allocation to meet utilization based on the change.

In examples, the energy equipment inventory is managed over time algorithmically to optimize the productive performance of the energy-equipment inventory. In some examples, the energy equipment inventory can be optimized using artificial intelligence. In other examples, the energy equipment inventory can be optimized using neural networks.

BRIEF DESCRIPTION OF THE DRAWINGS

FIG. 8 illustrates various algorithm optimizations according to principles of the present disclosure.

DESCRIPTION

Figure 1:
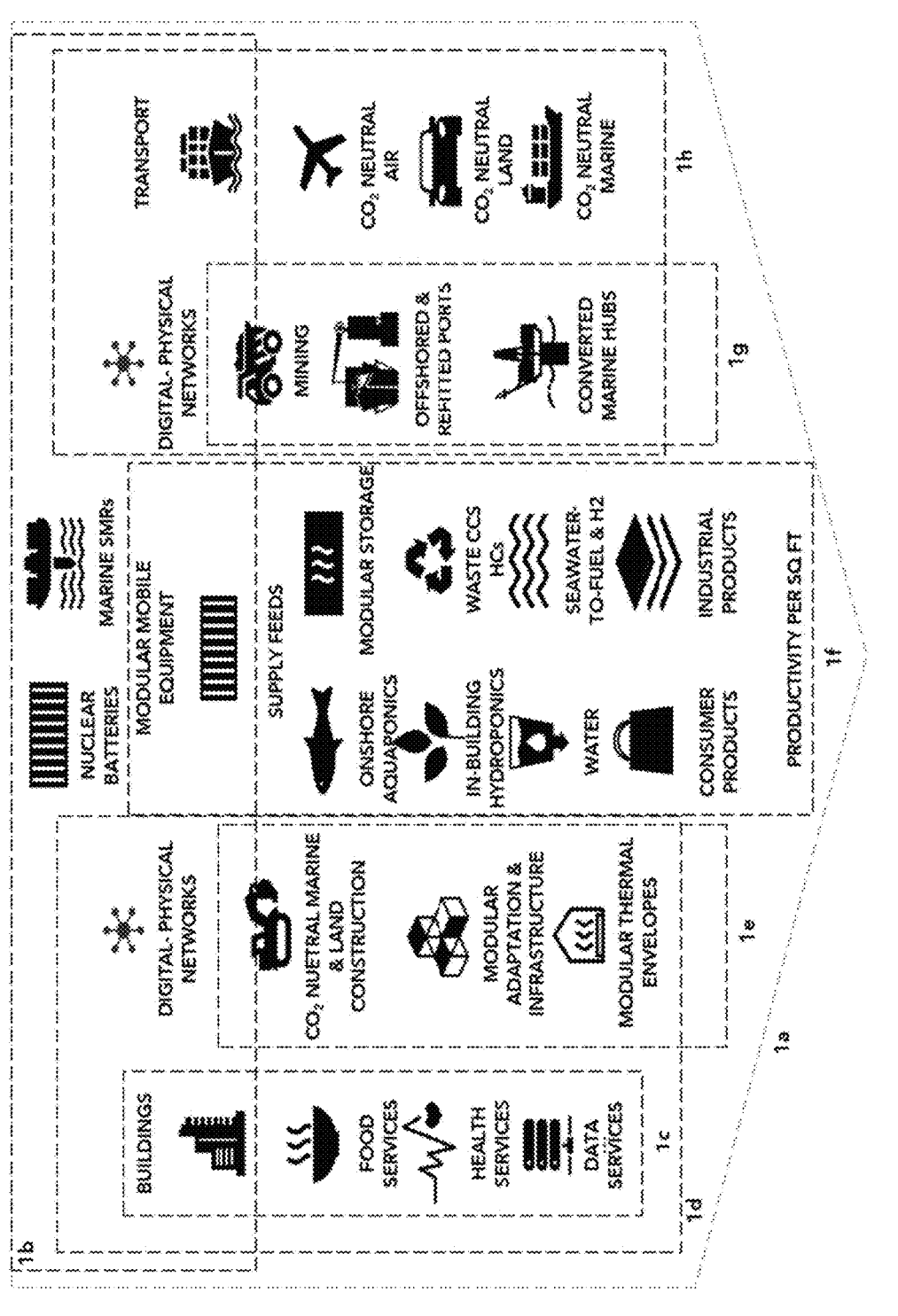
FIG. 1 is a schematic of an integration of multiple productive and processing uses in combined systems across an economy integrating energy, information, infrastructure and industry in modular productive packages according to the principles of the present disclosure.
Figure 2A:
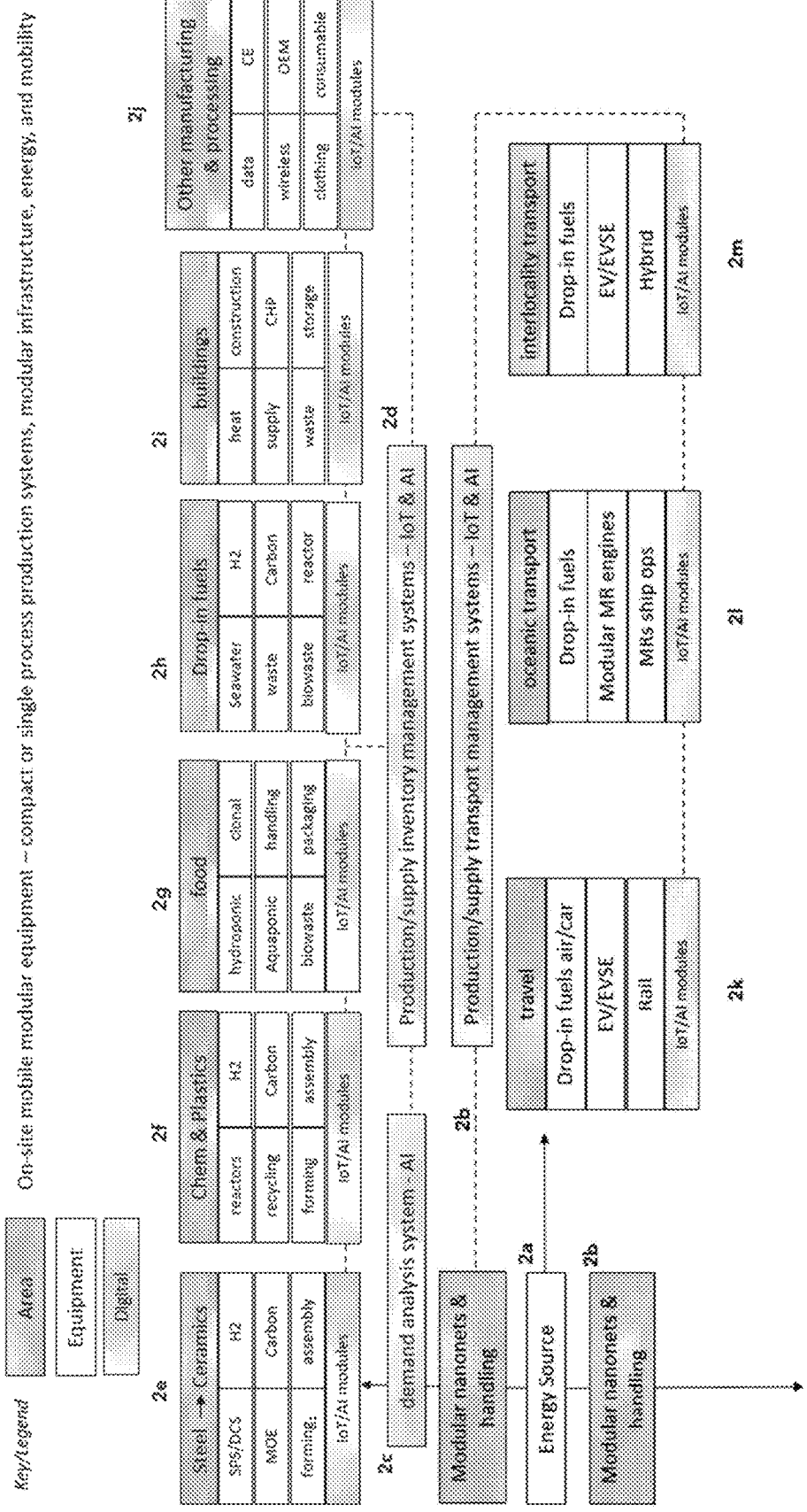
FIGS. 2A-2B is a schematic of applications of combined systems in industry (2e-2j) to transport of goods and people (2k-2m) and integrated revenue producing infrastructure (2n-2q) all integrated by artificial intelligence and/or IoT networks according to the principles of the present disclosure.
Figure 2B:
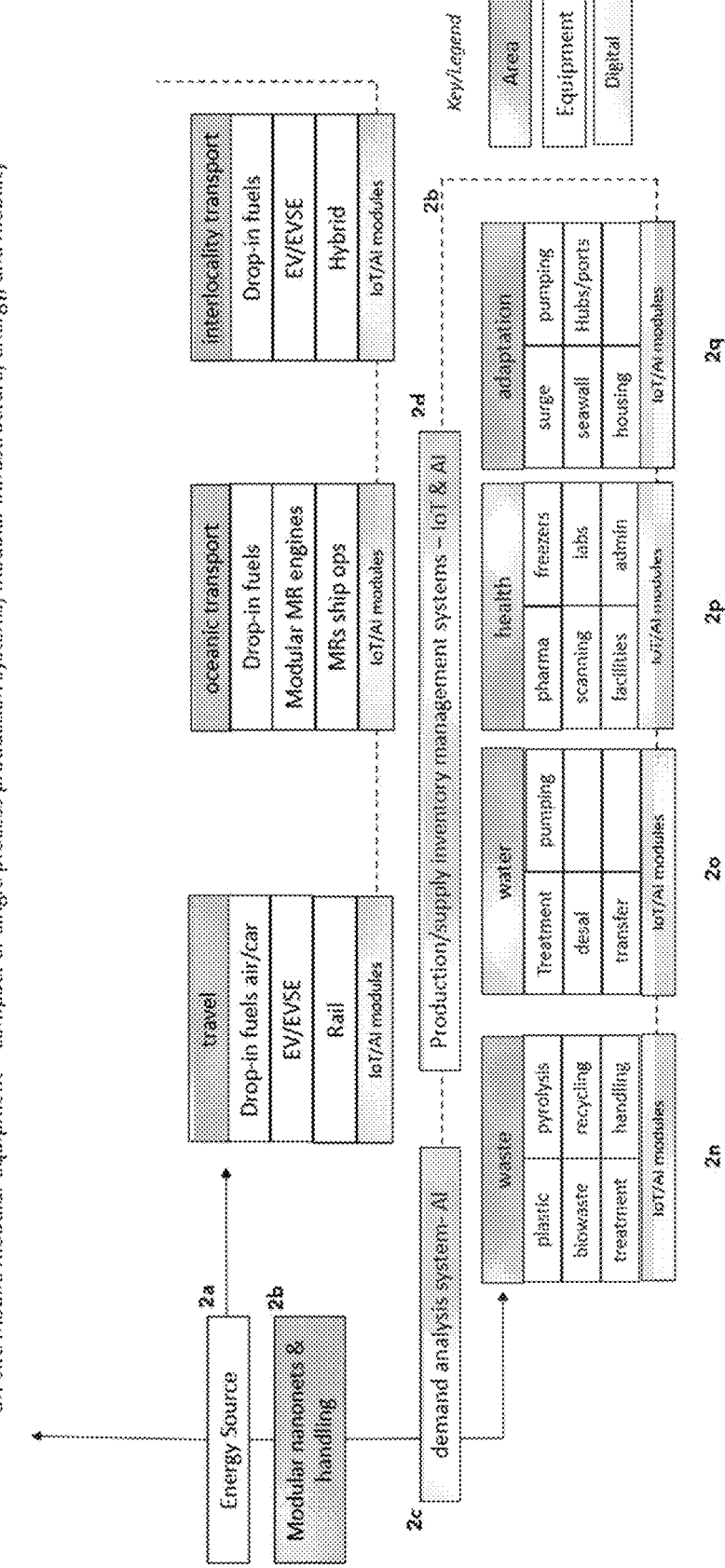
Figure 3:
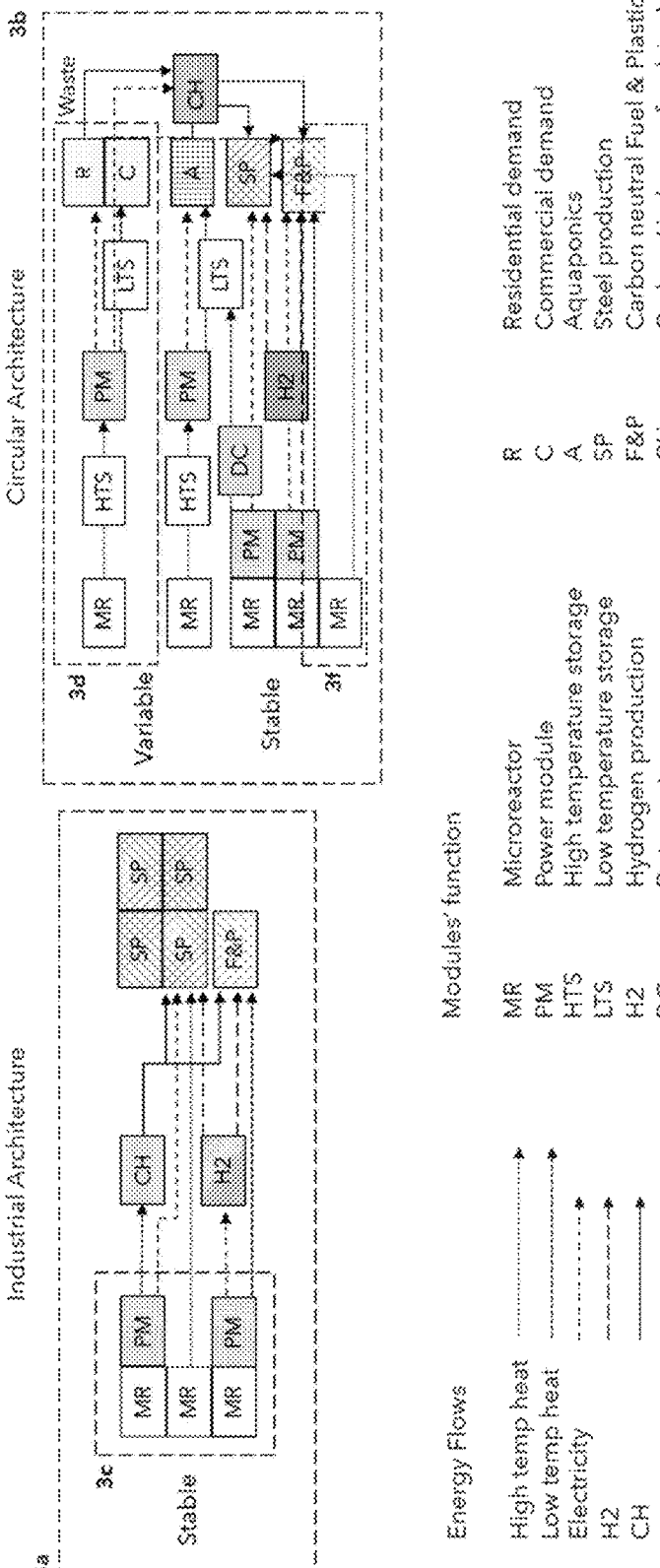
FIG. 3 is a an industrial architecture and a circular urban architecture according to the principles of the present disclosure.
Figure 4:
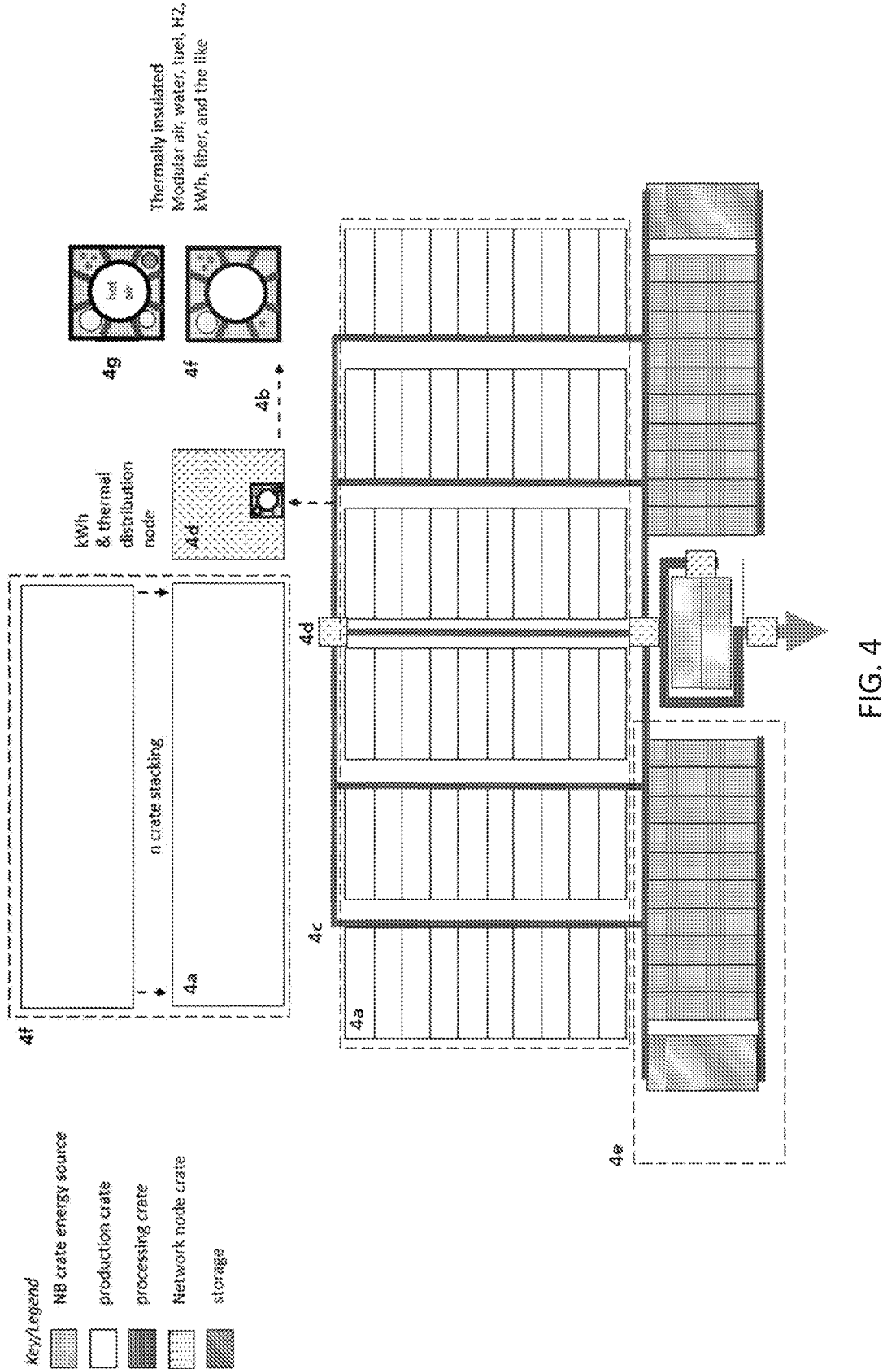
FIG. 4 is an advanced energy production and processing system according to a first example of the present disclosure.
Figure 5:
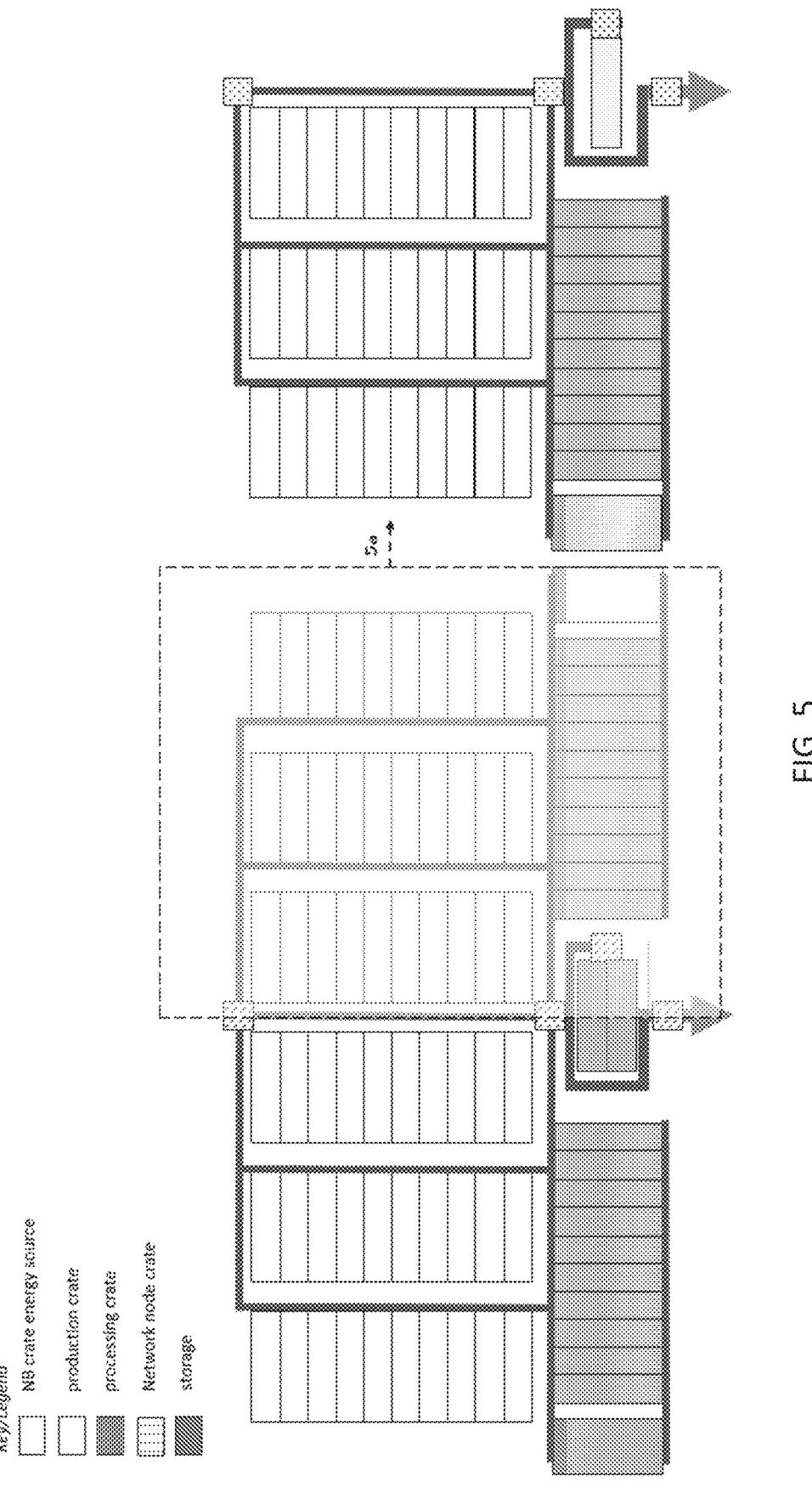
FIG. 5 is an advanced energy production and processing system according to a second example of the present disclosure where demand has dropped and reallocation has occurred.
Figure 6:
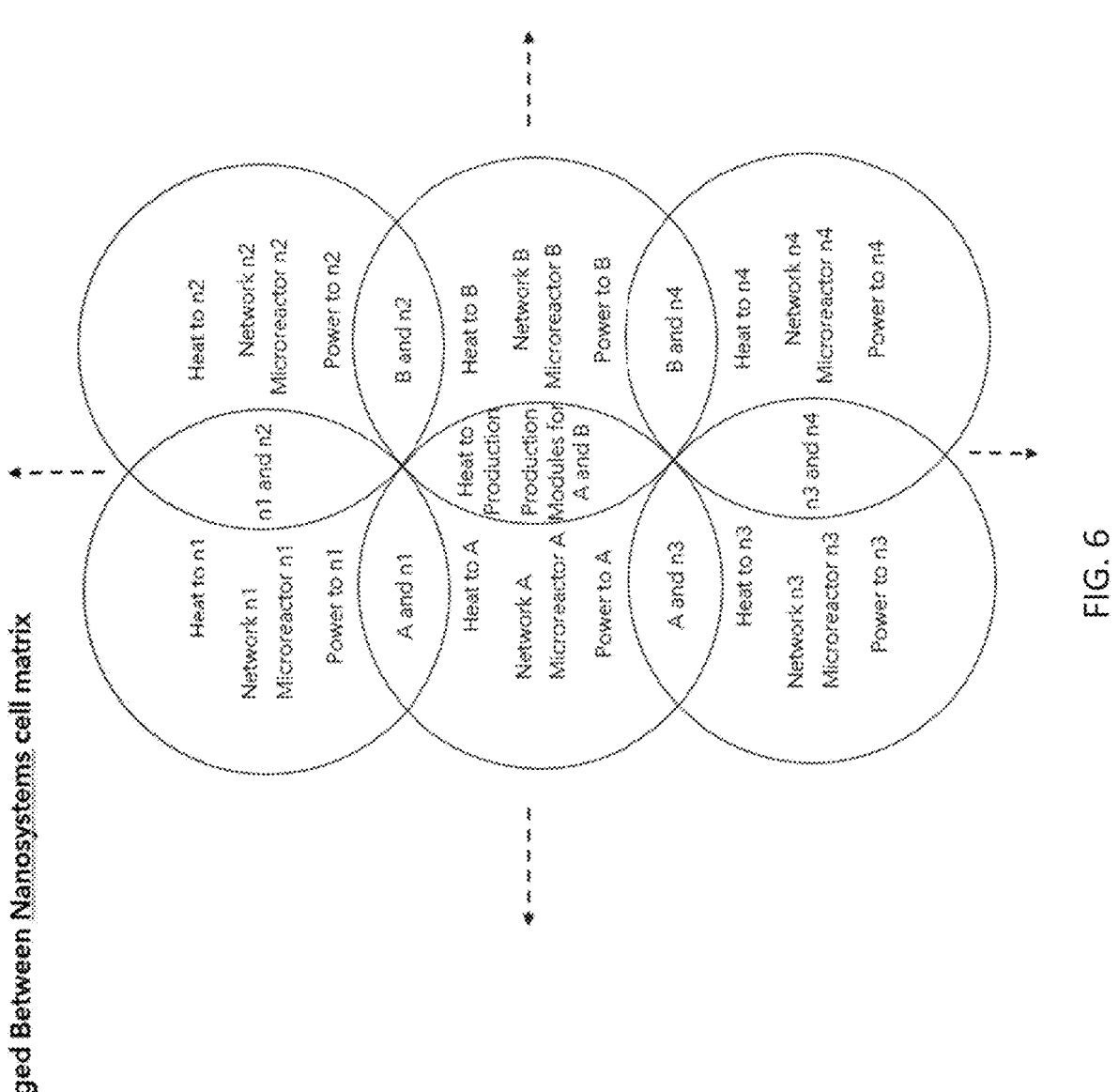
FIG. 6 is a diagram illustrating sharing of resources among n cells according to principles of the present disclosure.
Figure 7:
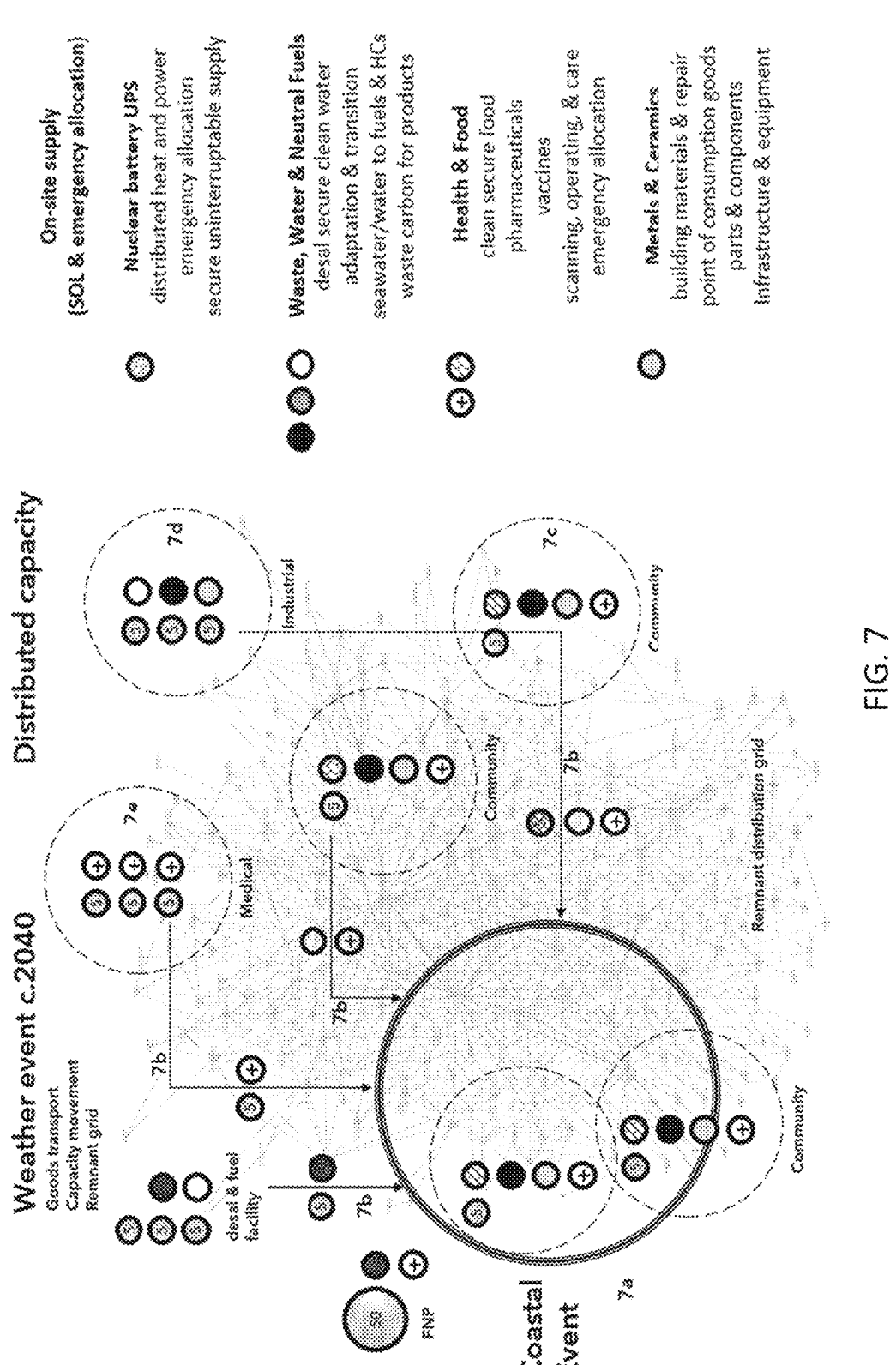
FIG. 7 is a distributed inventory of modular package systems responding to a weather event by reallocating resources based on emergency demand fluctuation according to principles of the present disclosure.

The present disclosure provides systems and methods that extend adaptability from the digital domain to the digital/ physical domain. Herein are disclosed x, y, z, and t system and subsystem designs, algorithms, and architectures to optimize the performance of such systems, which differ significantly from extant platform product or facility systems and supply chain architectures. Methods and architectures applied to date on energy-industrial systems have accepted the current system as the basic form of an energy-industrial system. However other systems may be designed with current levels of technology that may not observe the constraints or properties of the current systems.

The capabilities of modular energy-production combined systems, in terms of localized supply intensity & security and delivering economic and standard of living growth without fossils, have never existed before. But the methods and architectures being applied to these systems are all premised on the 20th century systems, which are radically different in their capabilities and optimized structures. There is no art or systems design or architecture on the optimization of modular systems and the associated architectures in x, y, z, t. Modular industrial capacity architecture and systems design may eliminate the factory or commodities plant in the first place and may avoid the legacy systems, including the grid, when paired with advanced nuclear or other forms of stable energy supply.

Time Modular Systems and Architecture

Herein are described systems and system architectures that constitute time modular energy-industrial systems (4, 5) and their design (3), management (8, 8a), and operations architectures (2). A time modular integrated energy-industrial system may be comprised of: integrated distribution and digital purchasing management channels and the like (1,2)), digital equipment and the like (1,2), energy equipment and the like (1,2), processing and productive equipment and the like (1,2), integrated modular supply networks and the like, automated handling and loading and the like (1,2), electric or synthetic fuel production and transport and the like (1,2), and the digital-physical management (2b-d) and predictive systems (8a) necessary to optimize the utilization of the equipment and labor hours to maximize productive purpose and returns. All inventory and network optimization methods as are known to art may be applied to the optimization of time modular system inventories and their economic and physical utilization in the dimensions of combined energy, industrial, infrastructure, and information systems or subsystems thereof (1,2).

Time modularity may apply to multiple levels of the system architecture and the ability to effectively use stable distributed resources as an inventoried energy supply. Equipment and component inventories may be managed over time algorithmically to optimize the productive performance of the inventory (5, 6, 8a). In embodiments the inventory utilization may be algorithmically optimized by learning or genetic or evolutionary predictive methods such as, but not limited, to neural networks and various means of AI or multivariate linear, non-linear optimization and the like, time deformed topographical content/product/services space algorithms, or hidden Markov chains and like methods of prediction as are known in the art. Modular compact production lines and energy sources and carriers may be designed into an integrated energy-industrial architecture (1a, 2, 3a, 3b, 4a-4g). Modular compact production lines may be integrated physically and digitally into compact energy-industrial systems which may include any combination of energy, conversion, and storage (3a and 3b) such as; an energy module in direct thermal mode (3f), an energy module or modules in kWh and heat mode (3c), and a thermal or electric storage block (3d). The combination and management thereof may optimize the results of the system in the dimensions of merit such as economic or mass of equipment or social or climatological results and the like. Integration of production and energy may be designed as integrated system architectures (2, 3a and 3b) to optimize the cost to return of the systems in terms of capital or labor or mass or land area and the like. In embodiments the optimization may be executed and managed recursively to maintain high utilization in the dimensions of merit as the demand topography deforms over time due to changes in constraints and conditions of the techno-socio-economic landscape (8a). Prediction may be achieved by analysis of the demand topography measured by the integrated energy, industrial, information, infrastructure systems over time (1, 2b-2d, 8) isolating trends in the topographical deformation across states using n-dimensional topographical analysis, isolating the critical points (maxima and minima n-dimensional waveforms) and their rate of and relational t1, t2, . . . tn deformation. This may be combined with methods of predictive optimization as are known in the art which may include but are not limited to evolutionary, learning, and genetic algorithms. In embodiments, an n-dimensional surface may measure the demand for a given product and equipment utilization associated with a specific product or inventory or subset of the inventories. As demand (inclusive of need) ebbs and flows, management of the inventory under multiple optimizations constraints will allocate energy and productive or protective resource accordingly (5a). Such inventories may be managed for multiple purposes wherein the inventories can respond rapidly to changes in need, location, or operation, such as emergency events (7). Inventories may be managed to provide emergency energy, productive, and construction reserves (7a-d).

In embodiments, systems of compact production may be used in modular systems and sub-systems to the component level. Such systems may be comprised of an inventory or multiple interconnected or related inventories. Inventory control and optimization may be applied to one or more component inventories, such as a modular equipment inventory and the product of the equipment inventory and an IoT inventory measuring demand, which when combined may substantially increase overall systems efficiency, stability, economic performance, and reduce waste (2b-d).

In embodiments, advanced systems may be a series of modularized compact industrial processes in a production line that eliminate the need for a facility or factory and in which geospatial specific capacity can be varied over time (5a, 7). In embodiments compact systems may be steel or other industrial systems (2e, 3a) that compact the equipment necessary to yield finished goods from raw goods without interstitial or precursor steps or commodities into a small capacity modular increment (2e-2j, 3a and 3b). In embodiments a steel, ferro-ceramic, ceramic, glass, or graphite systems and the like may be comprised of direct reduction or furnace or electrolysis reduction using modular heat amplification such as but not limited to arc, electrode, resistive, or pumped heating and control and the like submodules, and form or extruding modules, material handling and storage modules, cooling modules, stamping modules, assembly and handling modules and the like. In embodiments the modules may utilize direct current reduction of oxides and minerals into elemental metals and alloys or materials thereof, while simultaneously forming the metals into net shapes and near-net shapes in materials such as but not limited to metals, ferro-ceramics, ceramics graphite, glass, transparent ceramics and metals, and the like. Including doping of materials to achieve desired properties. They may be manufacture goods that are spatially bounded or pultrude an "infinite length" of material. In embodiments a module may pultrude a steel or high strength steel alloy that may be pultruded into a cooling module and stamped in a press module to provide parts and the like. In embodiments the direct current system may surface the material with surfaces such reticulation or patterning specific to aesthetic or functional surface or both. In embodiments surfaces created by the process may be nanoscale to mm scale. In embodiments the surfaces may be singular or multiple and may include nanostructures such as lotus leaves water beading and transport structure or shark denticle surfacing that promote a beneficial effect for the product in its applications. In embodiments the system may include integrated automation in handling, cooling, and finishing. Embodiments may include additive or detractive manufacturing and finishing and the like. Embodiments may include combinations of surfacing at different scales. In embodiments systems may be used to produce metal, ceramic, ferro-ceramic, graphite, and glass fibers such as but not limited to advanced fiberoptics such as ZBLAN and the like. In embodiments the systems may avoid having to join dissimilar materials by layering the materials in the forming process to give the material special structural and/or aesthetic properties and the like, or may create a functional gradient in materials or between different materials to enhance performance or strength, containment, performance, and the like. In embodiments systems may forge, stamp, roll, or extrude the material.

In embodiments systems such as, but not limited to, a direct current reduction system may be designed to switch rapidly between products such that, as demand and inventory of a given product reduces, the systems switch to different materials or products that exhibit higher demand. The management of such systems may be tied to management described herein to optimize the productive use of the systems to supply goods to local or distant populaces.

Combined or Integrated Modular Mobile Stand-Alone Networked System Architectures Economic positioning and results in markets may be determined by utilization rate and pricing. Utilization may be directly tied to amortization of capital equipment cost and pricing may be directly tied to supplied demand for a given product (8). The supply architecture/s may determine the gap between the operational efficiency and cost of the system and the pricing of the product or service made by the system, commonly known as margin. This may be a measure of the productivity of the system wherein the maximization of productivity achieved algorithmically (8a), architecturally (1, 2, 3), by process, or otherwise or any combination thereof may be an object of the system in n dimensions and may be defined, managed, and optimize algorithmically as the productive performance of the assigned budget and inventory of merit (2, 8a).

Modular systems operational performance equations and variables (8) applied in a optimization (8a) may be related to specific techno-economic state space variables and the like or a more expansive optimization set and the like.

The operational revenue & margin behavior of a productive systems can be described by:

$$CF_i = \sum_{i=-m}^{n}(p_i u_i) - ((ICC_i FCR) + CI_i + OE_i) \qquad \text{Eq. 1}$$

Economic performance in utilization the equipment and product inventories can be characterized by:

$$\beta_i = \sum_{i=-m}^{n}\left(\frac{(p_i u_i)}{(p_o u_{max})}\right) \qquad \text{Eq. 2}$$

Or separately;

$$\beta_{equipment} = \sum_{i=-m}^{n}\left(\frac{u_i}{u_{max}}\right), \beta_{inventory} = \sum_{i=-m}^{n}\left(\frac{(p_i)}{(p_o)}\right) \qquad \text{Eq. 3}$$

ROI at time n, taken as initial capital invested into cashflow, is;

$$ROI_n = \sum_{i=-m}^{n}\left(\frac{(p_i u_i) - ((ICC_i FCR) + CI_i + OE_i)}{(mICC\ FCR)}\right) \qquad \text{Eq. 4}$$

CF=Cash flow
ICC=Initial capital cost
CI=Annual cost of goods inventory: feedstocks, stock debt, and line costs
FCR=Cost of capital over period, bundled loan rate
β=Budget and equipment utilization
p=unit achieved pricing over period after markdown
$p_o$=unit full price before markdown
u=units produced over period
$u_{max}$=maximum unit production capability over period
n=economic period in quarters or annual
m=install period in quarters or annual.
OE=Operating expense including cost of business & levalized cost of replacement Base algorithm optimization for n inventories over a system connected in m networks. Performance variables of merit (e.g., sell-through) are matched in current state and trend of system performance using equations 1-4 to create n, n+1, n+2, . . . n+n backward and forward n-dimensional state topographies. Inventory supply volume equipment and products are optimized for state and trend conditions in the system demand, inventory performance and ROI. In case of negative trends to correct utilization or margin shortfall equipment inventory is reallocated and/or production type is switched in modular lines. The process is repeated.

The objective of the algorithms applying modular time performance equations (8, 8a) may be to optimize for a variable or variables of merit which may include, but are not limited, to optimization for ROI or p:u ratios, depending on the constraints applied to the systems and the number of optimization spaces (5a, 6, 8) which may include but are not limited to market and other dimensions such as emergency response or defense.

This optimization space may be differentiated from efficiency, which is a simple input to output ratio. Energy-industrial systems techno-economic architecture/s as practiced may not be optimized to leverage or maximize productivity and may only address internal efficiencies or simple input-output ratios such as GDP or commodities. This may be evident in the resource to commodity to product supply chains that deliver products to markets across multiple dispersed facilities and extended supply chains. This system may constitute a largely organically evolved architecture that may not be globally or locally optimized at the systems level for supply or economic performance within the context of current or potential technology and market drivers and constraints. Advanced modular technologies and architectures may allow designed systems to optimize and enable performance in the relevant dimensions, may optimize global and specific utilization of the system (4, 5, 6, 7, 8), and may be designed to solve for multiple issues in the socio-economic-atmospheric-waste-environmental dimensions (3*b*). Such systems may use compact systems. These compact and combined systems may address the production of energy, goods, and services such as, but not limited to, food (1*d*, 1*f*, 1*g*, 2*g*), water (1*e*, 2*o*), steel (1*f*, 2*e*, 3*a*), chemicals (1*e-g*, 2*f*), fuels (1*f* and 1*h*), pharmaceuticals (1*f*, 2*p*) and the like.

In embodiments, the algorithms may be optimized by cycle rate or predictive spread variants and correcting to evidenced results in a recursive analysis where n dimensions of merit may be optimized over m spaces. In embodiments, the optimization may be a multi-variate or the like.

These systems may be designed to produce finished goods directly from raw goods or to integrate their production into shared systems wherein raw goods or feedstocks and the like and processing from one compact production system such as H2 or ore or carbon and the like may be used in other compact systems producing finished products such as data, steel, pharmaceuticals, glass, materials, and the like (2, 3*a*, and 3*b*). Such may be integrated into larger systems in whole or in part such as infrastructure or built or transport systems (1, 2, 7). The super or sub systems may be optimized on global or intersystem and intrasystem networks (6, 7) by network and inventory optimization processes and algorithms known in the art and the like. Compact systems may include single module or multiple module systems (3) and the like depending on the complexity, and delivery and use needs of the end products or larger systems into which the energy-production systems are integrated. Critical to operation may be designing and recursively planning or allocating the most stable or stabilizable version of the systems. This may be substantially enhanced by designing multi-path recursive predictive systems into the digital demand and supply management of the systems (2*c* and 2*d*) and reallocation of assets (5*a*) to minimize perturbations' effects on the systems. Such optimization may include optimizing the generational allocation of the compact equipment inventories to optimize economics to available capital.

Compact energy can take the form of any intense stable or stabilizable form of energy generation or scavenging which may include natural gas, nuclear fusion or fission, modular passive fluid accelerators, modular hydro, geothermal, thermal solar, and the like. It may be mobile and able to plug and play and be unplugged into and from demand systems either designed for its use or in legacy applications, such as substations, distribution networks, district heating, building systems and the like providing a stable intense mobile energy platform and the ability to apply energy supply as an inventory that can be managed to produce results in n dimensions which may include the optimization or thermal, kwh, and supply/demand and finished product flows through the systems and may include integrating the demand supply positioning into the optimization (4, 5, 6). Integration of system/s may optimize by inverting planning supply into demand to planning demand into supply in whole or in part. This may be done by means of a process of design or architecture development or an algorithmic solution or a combination thereof and the like.

Any systems capable of fitting into a factory or building such as, but not limited to (2*e*-2*q*), medical scanning and testing, pharma, printing, structural framing, food production, data processing and the like may be redesigned into modular systems and integrate into supply networks. The ISO transport system or like may be an optimal envelope to modularize the majority of productive processes wherein the modular platform may be assembled and reassembled depending on function and necessary inputs and may be designed for the platform provisioning system to be easily assembled from a limited set of supply and operational modules such that the single platform and n modular components may be rearranged to deploy technologies ranging from food to processing to manufacturing or scanning. The baseline systems may be modularized to the complete supply or component level or may include variations that are modularized at optimal scales relative to the different inputs different operations and processing may require. In embodiments, such systems may share a modular heat production and management for heat temperature applications (1*d*, 1*f*, 1*h*, 2*a*-2*d*, 3 and 3*b*). Advanced production may be deployed opportunistically with various energy sources to maximize economics and returns. In embodiments modular capacity may be deployed at, but not limited to, the NG well head or a geothermal resource or processing plant or at an oversupplied pipeline hub to capture the lower mark-up price or discounted pricing at the source or point of oversupply and the like. Advanced modular systems may in embodiments deploy at a uranium mine to produce fuel and other derivative products on site. Systems may be deployed incrementally to minimize the amount of carried debt in negative cash flows and in embodiments may be reallocated in the case of a lack of further resources or sufficient demand to maintain positioning of merit. Mobile compact equipment inventories may minimize or eliminate stranded or underutilized assets through algorithmic recursive optimization and reallocation. These systems may be deployed in incremental packages of productive and energy capacity. As an inventory, allocation and content of packages is dynamic and managed as multi-type inventory over geospatial and temporal deformation, such that debt payments unmatched or exceed by revenue become a temporary condition for the systems rather than a permanent loss. Similarly, modularization of the systems packages down to the sub-component level may be desirable to eliminate equipment and product lifetimes. A system modular in t to sub-component level has no fixed lifetime, form, or function. By the nth iteration of a system the modules comprising the system may be completely different from the original iteration deployed.

Combination of compact process modularized production technologies, yielding direct production from resources and/or raw goods to non-commodity products combined with intense localized sources of energy such as Microreactors, Small Modular Reactors, advanced light water reactors, fusion reactors, NG turbines with or without Carbon-capture, Geo and solar thermal, or stabilized hydro or wind, and the like, may be deployed in a planned and optimized combination with each other and with modular digital-physical supply and management networks (1, 2, 3, 5). A microreactor (MR) may be defined as a small mobile nuclear energy source which may include either fission and/or fusion reactions and is capable of movement and plug and play operations. A microreactor due to its size, absence of need for centralized systems or external resources, and mobility may be suited to modular supply of energy for combined modular systems. Similarly geothermal or combined stabilized energy (such as but not limited to hydro, pumped storage hydro, solar thermal, and LWST wind) systems may be optimized for various productive purposes including, but not to limited, to heat, power and production systems. Modular supply networks connecting the energy sources, materials supply, and the productive equipment may include both enclosed area supply, manual or automatic handling and loading supply, and transport and may be used for the transfer of supplies or feedstocks such as but not limited to water, ore, data, gases and fluids, chemicals, electricity, heat, product to market, and the like (1f and 1h, 4g and 4h).

Production equipment technologies may include food, data & communications, metals, ceramics, ferro-ceramics, chemicals, fuels, water treatment and pumping, medical and health, and the like. Compact production systems may include all processing and handling necessary to manufacture a given product such as raw goods, water or methane, liquids and chemicals, ore and minerals, and sand processing, and the like (4e). In embodiments the combined systems may be designed into sub-units to be geospatially distributed to the point of optimum economics such that the entire process may occur in a single location or in embodiments may occur in multiple locations such that ore and minerals may be processed by the processing component at the mine and shipped as processed raw goods to a construction site or place of consumption for manufacturing into a finished product. In embodiments the ore may be shipped to the point of consumption/manufacture and processed into finished goods there or may be processed in transport which may be largely or wholly automated and may process atmospheric fluids into hydrocarbon and the like for additional or necessary feedstocks. This may have the additional benefit of removing carbon from the seawater, helping to deacidifying the oceans, and avoiding the use of biomass carbon for fuels. In embodiments the system may be deployed wholly at the minemouth or well head or dock and the like and finished products or OEM components are shipped to or within markets.

In embodiments, existing or legacy assets and new systems may be optimized to utilize each other to minimize the amount of capital or materials per unit of production or merit. Assets such as oil & gas platforms and the like may be repurposed with modular systems and nano/micro supply networks to produce drop-in fuels (1f) and other products that may be designed to maximize the removal and sequestration of oceanic carbon in the products (2e, 2f). In areas where commoditization is not addressable, such as fuel, the commodity systems may be deployed in ratios with the non-commodity systems such that the commodity pricing relies on the non-commodity margins to achieve penetration without extra-system subsidization.

This may all be executed and optimized through integrate digital management and networks (1b, 1c, 1d, 1 h, 2b-2d).

In embodiments such integrated distributed or single location energy-industrial-market architectures may connect, measure, and manage energy, production, and demand using digital networks and algorithms and physical technologies that have short, intensified, compact, embedded, or single step supply chains, such as, but not limited to, any combination of 3-D printing of non-biological and biological structures, additive or detractive manufacturing, chemical and bio reactors, modularized data centers, modularized infrastructure, modularized industrial processing and manufacturing, containerized or urbanized farming or food assembly, closed and open loop aqua-hydroponics, clonal food systems, and the like, (1c, 1f, 2g) and may be more optimized for economic positioning and socio-economic performance. In embodiments such architectures (2, 3) may be applied to various systems and sub-systems of supply and demand to isolate the energy and equipment needs for the supply in the local area of demand and verticalize a large portion of basic supply of goods and services (1). In embodiments such systems may additionally be designed with multi-function architectures wherein integrated systems may generate one or more revenue or supply or benefit streams to further amortize the system costs or enhance the system's productivity and value in economic dimensions and beyond.

Examples, of multi-function architectures may include industrial or infrastructure architectures (1a, 1d, 2a-j, 2-q) wherein modular elements of the system may be combined to optimize the revenue streams from the systems. In embodiments modular systems may allow multiple revenue streams from a single spend. In embodiments, a sealevel protection system may be designed to offshore ports generating development revenues from the prior port assets and may be designed to include more revenue producing activities such as, but not limited to, commercial and residential, production of food, entertainment services, hyperloop transport, and industrial and neutral fuel production (1h, 2a-d, 2k-m). Such systems may have modular level assembly architectures associated with the expanded revenue streams allowing specific deployments, infrastructure capabilities and potential revenue streams to be adapted to optimize the systems for local needs and capabilities. Modular marine and littoral and wetland systems and construction or adaptation systems may include all modules necessary for the operation of the infrastructure such as but not limited to gantry or crane modules, MR modules, transport loop modules, residential and commercial modules, very large floating structure modules and the like, including but not limited to ocean floating airports, open ocean hubs, and the like and the combination thereof. Modules may be fully or partially integrated into the infrastructure. Modules partially integrated into the main structure may include subscale floating structures for productive or built environment uses and the like.

In embodiments island and coastal protection systems may be deployed as a combined system of built environment, aquaponics and production, and energy modules (1a, 1d, 1f, 2a-d, 2f, 2g, 3b). Micro aquaponics and other productive services may be transferred and licensed as digital production files to modular equipment systems as the production systems approach mass or quasi-mass customization.

In embodiments, Carbon Capture with NG may be deployed in an area with a confluence of natural resources and energy sources. In embodiments drilling may be initially deployed for the NG and then the wellheads may be converted to geothermal systems without the need to drill and the location's productivity may be further enhanced with MRs and the like. In embodiments colocation of NG, MRs, stabilized RE, and geothermal in such locations may optimize the scale of production to the limit of local resource capacity to optimize returns to the locality. In embodiments systems' plug and play architecture and revenue streams may minimize the infrastructure sunk cost as a percentage of the overall capital outlay.

In embodiments modular adaptation to sea level rise, fresh-water shortages, fishery collapse, and the like, may be deployed over time from surge protection to complete seawall. The surge or seawall protection may serve as the foundation for a built and/or productive environment and may include various resource supply, industrial, transport, commercial and residential uses, tourism uses, and the like. In a specific embodiment, a modular erosion-surge protection system may be deployed as hulls and may be moored or grounded, depending on depth to break up wave forces and thereby the effects of wave action on the shoreline. Such hulls may be outfitted with various modular production systems such as hydro-aquaponics or modular desalinization or H2 or drop-in fuel production and the like. The modules may be designed to serve as a housing foundation as well as a productive one. Such modular systems may avoid the sunk cost nature of infrastructure by enhancing the infrastructure's overall productivity in multi-use systems and sub-systems, and by allowing further adaptation of the modular systems over time.

Combined modular systems may avoid fixed system predictive limitations by mobilizing the modular capacity (5a, 7b) and reducing or eliminating the sunk costs of centralized fixed capacity infrastructure and construction. This may remove the need for utilization prediction and avoid its constraints in the system architecture itself. This may allow just-in-time paradigms for supply broadly across the entire economy. It may allow the combined inventories of equipment to operate in dynamic paradigms that may better match the market demand they serve. Further advanced production systems may be combined and designed at the allocation level to yield desired results rather than relying on the singular economics of commodities as the current model is in sectors such as food, steel, electricity, and the like. In embodiments, combined systems may utilize local vertical-ization of supply from energy and resources to products. Combined systems may be designed to circularity at the scale of localized systems or economies (1a, 1c-f, 3b, 6, and 7). In embodiments waste may be considered feedstock that may be processed with direct or waste heat from energy generation (3b). In embodiments systems may be optimized for circularity by maximizing productive margins in abso-lute terms and absorbing the costs of circularity as part of the cost of said supply. Systems may be algorithmically opti-mized to yield the maxima for margin and circularity. Advanced management systems modularity may supply and manage local and global demand in real time through rapid data mining or predictive approaches described herein. In embodiments optimization methods outlined above and the like may be applied in multivariate operations to optimize desired results. Supersystem optimizations may be desired wherein each system optimization goal may be concurrently weighted by order of priority or relevance or the like and the global optimization of the system becomes a function of integrating the specific sub-system optimizations.

In embodiments multiple systems may be integrated in a community supersystem comprised of singular or multiple buildings wherein the heating, food and water supply, com-munications, and the like are integrated into new or legacy buildings (1c). In embodiments the heat or power may be shared between the building system and other adjacent systems and may constitute a Venn-like system wherein the shared energy between two or n systems is applied to products that supply the two or n systems' populations and/or interlocality trade (6).

Modularity architecture at multiple scales may allow the system to adapt more rapidly by effectively increasing the degrees of freedom for potential energy-industrial system design and architectures or effectively increasing the "muta-tion" rate and range to speed adaptation to the current and anticipated future states. These platforms may allow dynamic response to be designed into energy-industrial systems.

In embodiments it may be optimal to use predictive algorithms described in the previous sections to determine optimum distribution. Combined Energy and Power cells may be connected at n steps such that the connection optimizes the stability and balancing of supply and the utilization of the systems across m cells (6,7). Such cellular supply systems may operate independent of centralized supply or distribution either wholly or partially forming a complex "Venn" supply matrix (6).

In the systems described herein the modularity may be found at multiple scales and may include all elements necessary for the system to be delivered, assembled, con-nected, and begin producing or supplying (3a and 3b). These systems may be product, service, or resource specific or may be deployed in blended or hybrid systems which are opti-mized for supply volume, margin, and like dimensions of socio-economic import.

CHP as practiced is of low impact as the systems it is applied to are neither particularly advantaged in the supply chain nor were the fixed facilities or local labor market designed with on-site energy supply in mind. In embodi-ments herein CHP is practiced as a planned and managed system and the utilization of both heat and power at the maximum rate of which the energy source is capable may be inherent in the systems' modular design and architecture.

Intercell supply and optimization may be physical or digital or both (1, 6, 7). In embodiments production systems may be designed to adapt inputs-outputs to produce specific unique products. In embodiments specific localities may customize the input-outputs of the production equipment to produce unique products specific to the input output and designs and formulas used by the locality. In embodiments software may enable integrated design and fabrication pro-cesses in the dimensions of computer assisted design applied to products at the molecular scale. This may allow for digital distribution of products and licensing of said products to other localities' production equipment that may manufacture specific versions of items based on a digital "recipe". Digital rights and management of said designs may be applied by file standards to quasi-mass customization or true mass-customization that may be enabled by subsequent genera-tions of advanced combined systems. With integrated sys-tems with true mass customization and CAD based design, interlocality trade may be executed as the exchange of digital files between advance systems and the shipment of geospatially or otherwise unique mineral or material resources to advanced systems.

Optimization of margin may be an object of combined systems that are designed to cut supply chains either wholly or partially. Current systems treat margins as functions in larger supply chains from resource to commodity to factory to distribution. Modular mobile combined systems may change these constraints at the system design and function level, compacting current extending supply processes and supplying compact production processes on-site with an intense mobile energy source such as fission or fusion microreactors. This may yield a different type of economic structure to be optimized enabled by the combined systems and may require or engender or allow a significant change in system design to accommodate new rates of volatility and complexity. Volatility with fixed systems requires accurate predictive capability of system demand over the economic lifetime of the system which may be impossible with levels of volatility that exceed predictive capabilities or prior experience. A system solution to this issue may be a system design that does not require extended prediction to maintain utilization rate of the equipment. Such system designs to address volatility may be architectures that avoid or mini-mize construction or non-mobile components and combine said components in economically advantage and optimized inventory that can be managed and further optimized over time.

Modular systems architecture may leverage both the volume efficiencies of scale production and external pro-ductivities in final use or end product markets, and thereby may increase the effect of integrated system design on economic competitiveness against fixed systems.

A modular energy-industrial system may be an energy-production system (2, 3, 4), an energy-building system (1c), an energy-construction system (1e-1g), an energy-adaptation/infrastructure system (1e), or an energy-transport system (1f-1h) or any combination of said systems and the like (1, 2, 3, 5, 7). These systems may be comprised of multiple modular components to optimize the flexibility and resilience of the systems. These systems may be unique in that they combine an intense mobile energy source with a mobile production system that allows the energy source and the production systems to isolate demand and supply at the local level (7c-7e).

In embodiments these combined energy and production systems may be designed as stand alone integrated systems or cells within larger cooperative networks or if needed connect into existing systems from the distribution to the plant to building level (6, 7). In embodiments the systems may be operated with modular "plug and play" physical-digital networks wherein the network may be outfitted to a particular combined system's specific purpose or properties in terms of function and effective capacity and such capacities may be mobilized with the complete operational package necessary to localize the production and supply (3). In embodiments the systems may be designed to deliver both or either power and heat from the mobile energy source.

In embodiments IoT systems such as remote health management or household consumption management (food, heat, kWh, and the like) through software/hardware systems may inform the overall system in close to real time of shifts in consumption and thereby basic demand of energy, food, water, health services and the like (1, 2, 7). Optimizing such systems for high utilization and delivered value may be achieved by combining current IoT paradigms with AI-learning network optimization (neural networks, genetic algorithms, and the like), energy and industrial management systems, and allocation/merchandising systems (2, 5a, 6). These combinative systems may be modular in nature such that the management systems and the equipment are treated as mobile inventories to adapt to demand's specific distribution over time. The closer the prediction of demand and the actual demand the better the systems' utilization may be. Energy-industrial systems may be combined with digital optimization to optimize and further stabilize the physical means of societal supply to demand. Such systems may utilize just-in-time cycles or designed inventories cycles and product lifetimes to minimize waste and over supply and maximize equipment use and margins. Such systems may be applied in circular systems or closed-loop systems and like architectures (3b) to minimize environmental and societal effects of waste. Such systems may be localized by means of modular pre-fab or custom networks designed to connect and move with the required capacity to supply the local demand (4). Such systems may be designed to plug and play into existing building or facility standards.

Of import is the digital-physical nature of the systems is such that digital rights management systems may be applied to produce tailored outputs within a DRM franchise or license or the like basis. In early embodiments the DRM may apply to specific use of combinations in modular production that are proprietary on some IP basis. In later embodiments such as mass customization systems the DRM may be a digital file that is licensed on demand to supply a populace with a specific or multiple versions of a product category. In embodiments the differentiation between products may include design or efficiency variations and the like.

The design of product may extend to the nature of the product and or the characteristics of the product. In embodiments these systems may take the form of designed molecular structures, genetic structures, design aesthetics, and the like which maybe be realized from a digital file and the supply of basic resources necessary for the products.

Licensing and payment of the unique designs may be realized through a DRM system that insures payment of a licensing fee to the originator of the unique design. DRM systems may include intellectual property management in licensing specific "recipes" applied in advanced production. In embodiments areas such as alcoholic beverages, food, and the like may use a specific proprietary formula to achieve uniqueness of product and with an advanced brewing or food modular system and the like the digital recipe may be replicated in any advanced module deployed widely across the globe. Food, metal products, consumer products and the like may be produced by these methods and constitute a digital version of product supply rather than a shipped version of product supply (3a).

In embodiments, Combined systems may be deployed with plug and play mobile capacity or connect into existing systems to leverage the sunk cost of the existing systems to end of lifecycle (1f, 1e, 1g, 1h). Combined systems may be deployed to utilize existing capacity such as water management systems or fuel pipelines or steel mills. In embodiments this may be useful to utilize the embodied carbon of existing systems to their useful lifetime. In embodiments off-shore platforms may be repurposed by combined systems (1g, 4g and 4h). Combined systems may use advanced production supplied with MRs to clean said extant facilities or systems' operations.

X, y, z, and t (time) modularity in these systems may exist at all scales from the system scale to the component scale (2). Sub-systems may include modularized networks (4g, 4h), production lines, energy sources, storage, handling and intra & intersystem transport, AI and embedded intelligence systems, sensors and management systems, modular network systems, automated warehousing systems, robotic systems and the like. Modular energy industrial systems are differentiated from other systems in the art by their ability to adapt to market or other conditions over time (4, 5, 7). In modular systems that include the t dimension, energy and demand capacity (industrial, transport, supply, etc.) become flexible inventories that can be reallocated and managed according to need and results. Reallocation architectures and methods for industrial or infrastructure capacity are unknown in the art. Fixed energy-industrial systems cannot adapt to changing demand distribution or purpose rapidly or locally nor can they easily include dimensions of import other than market performance.

In the systems described herein the modularity may be found at multiple scales and may include all elements necessary for the system to be delivered, assembled, connected, and begin producing or supplying (2, 3, 5a). These systems may be product, service, or resource specific or may be deployed in blended or hybrid systems which are optimized for supply volume, margin, and like dimensions of socio-economic import.

CHP as practiced is of low impact as the systems it is applied to are neither particularly advantaged in the supply chain nor were the fixed facilities or local labor market designed with on-site energy supply in mind. In embodiments herein CHP is practiced as a planned and managed system and the utilization of both heat and power at the maximum rate of which the energy source is capable may be inherent in the systems modular design and system architecture (3, 5a).

In embodiments a system such as a steel or food system may not produce any commodity goods such as cold rolled coil or soy or corn, and may instead produce more valuable products such as cladding or abalone and the like that are also able to be differentiated by quality and perception in the marketplace.

In embodiments advanced systems may be deployed with an existing facility such that the advanced systems pay for the cleaning of the extant facility of fossil supply, while retaining the existing capacity until end of life at which stage the existing system may be replace wholly by the advanced systems.

Advanced Production

Modular advanced production is taken in the expansive meaning of the word, all products and services that are consumed in an economy. Advanced production may take the form of single, short, or compact production process or systems of processes that are designed to avoid or reduce the need for construction of factories, facilities, and the like, or commodity traded precursor products such as chemical precursors or cold rolled coil and the like. In embodiments the production process or processes may be combined with modularity and mobility in iterations of the production equipment and optimized to n capacity increments. The n sized increments of capacity may be incrementally or micro-phase deployed without a facility, in the normal factory, plant, or hospital sense of a facility making a single or few products or providing single-type services. The increments may be managed in inventory networks and as inventories of production equipment to optimize the operation of the system to desired economic and other desired results, such as community supply or a given economic-industrial intensity and the like.

In embodiments: Different production types may be integrated and managed to produce optimum positioning or results in a desired dimension. In an embodiment, advanced fuel production of a commodity fuel may be deployed with non-commodity production such that the combined systems performance exceeds that of the commodity technology. In another embodiment advanced steel production may be deployed with an existing steel plant to reduce the emissions of the combined system. In another embodiment a system may be incrementally deployed to minimize unpaid debt. In another embodiment an advanced community system may be deployed to reduce community emissions and risks, and increase energy and production per capita. In embodiments the systems can be planned to optimize the equipment utilization or on any desirable dimension or dimensions. In other embodiments the overall carbon fixing and storage of the system may be optimized by examining the net GHG production of say a biowaste fuel in the context of combinative advance architectures which may include seawater to fuel technologies for commodity fuels for a neutral cycle and biowaste pyrolyzed to char for product carbon feedstock wherein the fixed carbon is stored in products and recycled through the systems. This may avoid the rerelease of bio-captured carbon into the atmosphere Such systems may be optimized using methods of multivariate optimization in n-dimensional space that may include fuzzy methods or AI or learning networks. Methods of predictive optimization may include recursive trend-driver based prediction wherein the economic and/or other area/s of import state/s are analyzed historically, present, and forward with randomized or selected variables, nature and number, to identify the commonalities (drivers) and the evolutionary trends of successive states. Evolutionary trends when combined with the commonalities may be used to identify n likely paths that the next state may take. An evolutionary system will exhibit a boundary condition on the rate of change. In biological systems this is determined by the mutation rate. In market systems it may be determined by the real rate of innovation within a maxima minima boundary. This process may be performed recursively and continuously to optimize utilization of advanced systems and minimize oversupply of energy-industrial equipment or products and services they provide.

Advanced energy is taken to mean a compact mobile energy source that may include nuclear fission and fusion microreactors, generally below 100 MWe. Advanced energy may be deployed to utilize both its power and heat and to maximize the use of the heat and power.

Herein are described methods for supply and handling systems, equipment, and physical and physical/digital network architectures for the operation of modular combined systems that may be modular in x, y, z, and t dimensions. Modular combined systems may be optimized to further dimensions of import. Modular combined systems combine the generation and use of energy into a system or series of interconnected systems or cells that maximize utilization of the equipment at hand and minimize waste in materials and capital. These combined systems can also combine different types of uses with the energy sources to optimize the economic or socio-economic results of the production systems. Such systems may be optimized by the use of inventory optimization methods known in the art but means of recursively predictive and corrective algorithms that maximize the inventories' use or productivity in given or multiple dimensions. Such methods may including the simultaneous optimization or 2 or more inventories that may be combinations of raw goods, equipment, product, and digital inventories and the like.

Development of such systems may separate the process of technology and network design and performance optimization into distinct cycles, and design and research tracks to optimize the stability and economic performance of the system such that the systems may be designed to integrate multiple dimensions of optimization and designed to most effectively supply demand for resource supply, goods, or services with the least waste and thereby delivering higher economic and societal intensity per unit of energy supplied.

The systems may have n basic forms which may include: combined energy and production, combined energy and buildings, combined energy and adaptation, and combined energy and transport/construction and the like. To optimize effect these systems may be deployed combinatively or singularly.

Combined energy and production describes a system of modular energy and production equipment wherein the capacity for energy and production are matched either directly or through thermal storage module/s to maximize utilization and productivity of the energy and production equipment. The energy is supplied by a microreactor or some other intense clean stable energy source. In embodiments the equipment may be connected to a modular network comprised of handling and/or supply networks. In embodiments the equipment and the networks may be largely or wholly automated.

Combined energy and buildings describes a system of modular energy providing heat and kWh to a building, with excess energy or additionally desired capacity applied to supplying the building with products such as food or computing/communications capacity. This architecture may optimize the energy and systems economics and effect in localizing supply and increasing resilience to manmade or natural events.

Modular combined systems in embodiments may be deployed and managed in n capacity units wherein the deployment, distribution, and management of said units optimize the performance of the units specifically in the deployment and globally in the inventory of the equipment comprising multiple deployments. The optimum n capacity unit may be designed through optimization processes that maximize the flexibility and economic benefits of the system according to the following algorithms . . . .

Incrementally deployed and managed systems have a significant advantage in stabilizing performance and results if optimized to the basis algorithms described. In embodiments the unit/s of import can be specified to target optimization of a given dimension or optimize for multiple dimensions of import.

Combined Energy and Production (CEP) Systems

In embodiments CEP systems may be deployed on land or may be deployed on water. In the marine embodiment MRs may include coastal, littoral, or marine deployment wherein the CEP may be combined with an existing or new floating platform which may be of a Very Large Floating Structure type that is stabilized such as a spar structure and the like or rolling floatation where stability is not necessary. The VLFS may serve the purpose of goods and services production, work/living space and built environment, transportation hub, fuel and materials from seawater manufacturing.

CEP Networks

CEP may be designed for an incremental provisioning architecture wherein the capacity may be deployed in n increments as demand or share increases. Once deployed the inventory may be managed to maintain a high utilization coefficient. CEP techno-economic architecture may be deployed incrementally in plug-and-play modular systems.

In embodiments the MRs and the modular equipment may be used in a self-production node to supply a network of equipment to markets, accelerate the availability of the equipment, and reduce cost of the equipment. A self-production node architecture may be comprised of some or all of the production equipment necessary to manufacture the energy and production equipment and the equipment may be distributed to the inventory network to expand the systems' supply capacity to meet increasing demand. This may include steel, electronics, robotic assembly and handling, finishing, H2, advanced forming, and may be deployed to manufacture the whole or parts of the equipment or systems. Algorithms that predictively or just-in-time manage supply capacity on a production cycle basis may optimize the overall utilization rate of the system, reversing the current trends of underutilization in centralized systems. The algorithms may include optimization of either or both the supply of new capacity or the inventory of capacity.

Modularized systems may be developed in different modes as the market network is developed over time and dependent on the type of product or service.

Algorithms applied to optimize the utilization of the inventory may include predictive, learning, neural network, genetic, and AI algorithms and the like to consistently match supply capacity of both the CEP equipment and the goods produced by the equipment to the demand rate in the local and interlocality (export) market/s. This architecture avoids over deployment of equipment and the need to predict on a long-term basis the demand factors of the capacity. Combined with a network/inventory management architectures informed by the algorithms the systems may damp volatility leading to further reductions in the cost of risk.

In embodiments systems may be deployed in network hub and edge models wherein in an embodiment the equipment is produced at a node and exported to another node or the demand "network" edge. In embodiments other nodes may include food "hatcheries" and the network edge may be at the point of consumption.

Preferred embodiments systems that may be spread from nodes may include: Advanced ceramics and metals, passive carbon aqua and hydroponics, neutral fuels and HCs, foodstuffs such as Saffron, abalone and mollusks, fungi, caviar, high value fish, dried products, brewed products and the like.

Combined Energy and Building Systems

Modular systems may optimize the deployed capacity necessary to meet peak demand with sufficient reserve to counter unforeseen energy needs or spiking. In current systems Peak Summer or Winter capacity must be account for the full demand rating necessary. In current clean systems this involves massive use of storage (greater then 100 kWh per KW) to insure the necessary energy is available when needed. Large scale electrification of heat and transport through centralized systems will exacerbate this problem severely.

Combined Energy and Transport/Construction Systems

CET or CEC Networks

Modular systems wherein the transport component may achieve significantly higher energy efficiency overall than current systems such gas supplied EV or fuel based cars. Such system have 40% less efficiency since either the motor or the generator supplying electricity maximizes at roughly 40%. In the case of combined cycle 60% with 20% losses in battery storage and 85% generator eff nets out to the same. In embodiments, a MR supplied transport system may power the system by charging the thermal storage or batteries directly wherein the waste heat of the MRs that is not converted to electricity may be applied to various low heat applications including but not limited to pyrolysis, Combined Energy and Adaptation/Infrastructure Systems CEA or CEI Networks Combinative use modular surge and seawall systems comprised of seawall hulls that may be made of concrete, concrete composites, rock, composites, alloys, ceramics or ferro-ceramics such as silicon carbides and the like, and sandwiches of materials and the like and may include modules designed to incorporate transport, manufacturing, infrastructure, service, residential and commercial, and the like functions. The hulls may be buoyant such that if there is need for greater height the top layer or layers may be floated to allow riser modules to raise the seawall height to need. Seawall may be anchored to the seafloor as a continuous structure or may be a floating structure tethered to the seafloor with an extendable skirts that may be made of steel, woven metals, high tear strength composites, and the like. Systems may be disguised to appear as natural structures. Surge and seawall systems may serve as a tether structure for other floatation structures that may incorporate transport, manufacturing, infrastructure, service, residential and commercial, and the like functions. Systems may be designed to maximize the thermal stability of the interior spaces of the system to increase utilization of heat for other purposes and increase the overall productivity per unit of energy of the systems.

Multi-use modular infrastructures for sea level protection and other activities such as desal, aquaculture, and the like. The aquaculture may be isolate from the ocean to avoid the use of antibiotics. Modular seawall that can build from storm surge protection and production to full seawall in staged development as needed. Primary effect is land loss and flooding due to storm surge and inundation of costal and island fresh water source. A system to resolve these issues may be comprised of protection modules which are disposed to be outfitted with various energy sources and production and resource supply activities with integrated transport. At scales the systems may be used for anything from surge protection, using spaced modules to break-up the power of incoming waves, to full seawall inclusive of off-shoring ports and multiple habitation, production, and infrastructure applications therein.

Increases in capacity can be achieved by advanced energy-transport wherein the hull in which an MR or SMR is housed may be deployed for construction, energy supply, communications and media services, food production and the like. These system may be localized or travel as a construction system or emergency or ready reserve. The systems may rapidly convert an existing hull to a MR energy hull by use of sprayed and drop-in pre-formed concrete silos.

Marine versions of combinative systems may leverage and repurpose existing marine infrastructure and assets such as oil & gas rigs and the like. The repurposing of marine infrastructure may utilize MRs as the energy source, seawater to Hydrocarbons for neutral fuel, chemical, and plastic production, aquaponic systems and the like. The repurposed Very Large Floating Structures (VLFS) may further combine housing, food, consumer products, art venues and the like, and various societal functions for a full or part time marine community. VLFS structures may combined with modular energy, industrial, and infrastructure to form such communities.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A time modular system architecture that deforms energy industrial, and information productive inventories to a current supply and demand topography that evolves over time, the system comprising:

an energy source that outputs energy, the energy source comprising a plurality of mobile modular energy sources that are deployed in analytically determined combinations to provide energy to an analytically determined productive demand;

a productive component comprising a mobile modular productive capacity and a product offering output by the system, wherein an analytically determined productive capacity is matched to a first combination of mobile modular energy sources of the plurality of mobile modular energy sources that supply the productive component to meet an analytically determined first demand for the product;

a network component that connects the plurality of mobile modular energy sources to the mobile modular productive capacity to meet the analytically determined first demand for the product; and a digital component that determines shifts in demand of the productive component from the analytically determined first demand to an analytically determined second demand and optimizes the energy source by (i) initially allocating the first combination of the plurality of mobile energy sources and mobile modular productive capacity necessary to supply the analytically determined first demand for the product at a first location and (ii) subsequently physically reallocating and relocating mobile modular productive capacity unnecessary to satisfy the analytically determined second demand at the first location away from the first location based on the shift in demand of the productive component;

wherein each of the energy source, network component and productive component are dynamically modified as inventories to optimize utilization based on supply and demand to deliver higher economic and societal intensity per energy source.

2. The system of claim 1 wherein the energy source comprises a microreactor.

3. The system of claim 2 wherein the microreactor is one of a nuclear fission and fusion microreactor.

4. The system of claim 1 wherein the digital component comprises an Internet of Things (IoT) inventory module that measures demand.

5. The system of claim 4 wherein the IoT inventory module comprises consumptive premise equipment configured to measure the demand.

6. The system of claim 1 wherein the digital component comprises a digital purchasing management channel.

7. The system of claim 1 wherein the digital component manages automated systems and optimizes the energy source based on the shifts in demand of the productive component.

8. The system of claim 1 wherein the product comprises one of energy, food, water, and health services.

9. The system of claim 1 wherein the product comprises at least one of goods and services produced in an economy.

10. A method of deforming energy, industrial, and information productive inventories based on evolving demand topography, the method comprising:

providing a first allocation of energy equipment inventory at a first location, the first allocation of energy equipment inventory inventories including a plurality of mobile energy sources;

providing productive equipment inventories that produce a first allocation of production using the first allocation of energy equipment inventory;

outputting product inventories from the first allocation of production based on the first allocation of energy equipment inventory;

determining a change in at least one of demand, inventory performance and return on investment (ROI) related to the outputted product inventories from a first value to a second value; and modifying the first allocation of the energy equipment inventory to a second allocation of energy equipment inventory using a distinct quantity of mobile energy sources from the first allocation of energy equipment inventory to optimize capacity utilization based on the change, wherein the modifying comprises physically relocating unnecessary mobile energy sources to satisfy the second value and the productive equipment inventories away from the first location.

11. The method of claim 10 wherein the first allocation of energy equipment inventory is managed over time algorithmically to optimize productive performance of the energy equipment inventory and the productive equipment inventory.

12. The method of claim 11 wherein the first allocation of energy equipment inventory and the productive equipment inventory are optimized using artificial intelligence.

13. The method of claim 10 wherein the first allocation of energy equipment inventory and the productive equipment inventory are optimized using neural networks.

\* \* \* \* \*